(12) United States Patent
Sisk et al.

(10) Patent No.: US 8,957,623 B2
(45) Date of Patent: Feb. 17, 2015

(54) SYSTEMS AND METHODS FOR CONTROLLING MULTIPLE STORAGE DEVICES

(75) Inventors: Brian C. Sisk, Mequon, WI (US); Thanh T. Nguyen, Mequon, WI (US); Perry M. Wyatt, Fox Point, WI (US); Ryan S. Mascarenhas, Chicago, IL (US); Junwei Jiang, Glendale, WI (US)

(73) Assignee: Johnson Controls Technology Company, Holland, MI (US)

( * ) Notice: Subject to any disclaimer, the term of this patent is extended or adjusted under 35 U.S.C. 154(b) by 269 days.

(21) Appl. No.: 13/422,326

(22) Filed: Mar. 16, 2012

(65) Prior Publication Data

US 2012/0235624 A1 Sep. 20, 2012

Related U.S. Application Data

(60) Provisional application No. 61/453,474, filed on Mar. 16, 2011, provisional application No. 61/477,730, filed on Apr. 21, 2011, provisional application No. 61/508,621, filed on Jul. 16, 2011, provisional application No. 61/508,622, filed on Jul. 16, 2011.

(51) Int. Cl.
*H02J 7/00* (2006.01)
*H01M 16/00* (2006.01)
(Continued)

(52) U.S. Cl.
CPC ............ *H01M 16/00* (2013.01); *H01M 2/1072* (2013.01); *H01M 10/052* (2013.01); *H01M 10/06* (2013.01); *H01M 10/4257* (2013.01); *H01M 10/4264* (2013.01); *H01M 10/441* (2013.01); *H02J 7/1423* (2013.01); *H02J 7/345* (2013.01); *B60L 3/0046* (2013.01); *B60L 3/04* (2013.01); *B60L 11/005* (2013.01); *B60L 11/14* (2013.01); *B60L 11/1859* (2013.01);
(Continued)

(58) Field of Classification Search
USPC .......................................................... 320/101
See application file for complete search history.

(56) References Cited

U.S. PATENT DOCUMENTS 4,047,088 A   9/1977   Himmler
5,041,776 A   8/1991   Shirata et al.
(Continued)

FOREIGN PATENT DOCUMENTS

CN   101425612 A   5/2009
CN   201247804 Y   5/2009
(Continued)

OTHER PUBLICATIONS

International Search Report and Written Opinion for PCT No. PCT/US2012/029513 dated Jul. 19, 2012; 10 pages.
Patel, Prachi; "A Battery-Ultracapacitor Hybrid"; A device for power tools may also help regenerative braking; Technology Review published by MIT; Monday, Jan. 10, 2011, 1-2 pgs.
(Continued)

*Primary Examiner* — Arun Williams
(74) *Attorney, Agent, or Firm* — Fletcher Yoder, P.C.

(57) ABSTRACT

Systems and methods for controlling multiple storage devices are provided. A system may include a first storage device and a second storage device, each adapted to store and release electrical energy. The system may also include a controller coupled to the first storage device, the second storage device, and a load. The controller is adapted to optimize operation of the system relative to a first system parameter by controlling the channeling of electric charge in a variable manner between the first storage device, the second storage device, and the load.

21 Claims, 7 Drawing Sheets

(51) Int. Cl.

| | |
|---|---|
| *H01M 2/10* | (2006.01) |
| *H01M 10/052* | (2010.01) |
| *H01M 10/06* | (2006.01) |
| *H01M 10/42* | (2006.01) |
| *H01M 10/44* | (2006.01) |
| *H02J 7/14* | (2006.01) |
| *H02J 7/34* | (2006.01) |
| *B60L 3/00* | (2006.01) |
| *B60L 3/04* | (2006.01) |
| *B60L 11/00* | (2006.01) |
| *B60L 11/14* | (2006.01) |
| *B60L 11/18* | (2006.01) |
| *H01G 11/14* | (2013.01) |

(52) U.S. Cl.
CPC ......... *B60L11/1866* (2013.01); *B60L 11/1877* (2013.01); *B60L 11/1879* (2013.01); *H02J 7/0021* (2013.01); *H02J 7/0031* (2013.01); *H01M 2220/20* (2013.01); *H01G 11/14* (2013.01); *B60L 2210/10* (2013.01); *B60L 2240/547* (2013.01); *B60L 2240/549* (2013.01); *B60L 2240/662* (2013.01); *Y02E 60/122* (2013.01); *Y02E 60/126* (2013.01); *Y02T 10/7077* (2013.01); *Y02T 10/7005* (2013.01); *Y02T 10/7022* (2013.01); *Y02T 90/16* (2013.01); *Y02T 10/7061* (2013.01); *Y02T 10/7216* (2013.01); *Y02T 10/7016* (2013.01); *Y02T 10/7011* (2013.01); *Y02T 10/7055* (2013.01)

USPC .......................................... 320/101; 320/137

(56) References Cited

U.S. PATENT DOCUMENTS

| | | | |
|---|---|---|---|
| 5,146,095 | A | 9/1992 | Tsuchiya et al. |
| 5,155,373 | A | 10/1992 | Tsuchiya et al. |
| 5,155,374 | A | 10/1992 | Shirata et al. |
| 5,311,112 | A | 5/1994 | Creaco et al. |
| 5,642,696 | A | 7/1997 | Matsui |
| 5,666,006 | A | 9/1997 | Townsley |
| 5,844,325 | A | 12/1998 | Waugh et al. |
| 5,903,764 | A | 5/1999 | Shyr et al. |
| 5,993,983 | A | 11/1999 | Rozon |
| 6,057,666 | A | 5/2000 | Dougherty et al. |
| 6,081,098 | A | 6/2000 | Bertness et al. |
| 6,300,763 | B1 | 10/2001 | Kwok |
| 6,313,608 | B1 | 11/2001 | Varghese et al. |
| 6,325,035 | B1 | 12/2001 | Codina et al. |
| 6,331,365 | B1 | 12/2001 | King |
| 6,331,762 | B1 | 12/2001 | Bertness |
| 6,346,794 | B1 | 2/2002 | Odaohhara |
| 6,362,595 | B1 | 3/2002 | Burke |
| 6,586,941 | B2 | 7/2003 | Bertness et al. |
| 6,727,708 | B1 | 4/2004 | Dougherty et al. |
| 6,744,237 | B2 | 6/2004 | Kopf et al. |
| 6,777,913 | B2 | 8/2004 | You |
| 6,871,151 | B2 | 3/2005 | Bertness |
| 6,909,287 | B2 | 6/2005 | Bertness |
| 6,930,485 | B2 | 8/2005 | Bertness et al. |
| 7,035,084 | B2 | 4/2006 | Kaneko et al. |
| 7,076,350 | B2 | 7/2006 | Alvarez-Troncoso et al. |
| 7,126,341 | B2 | 10/2006 | Bertness et al. |
| 7,134,415 | B2 | 11/2006 | Burke et al. |
| 7,349,816 | B2 | 3/2008 | Quint et al. |
| 7,360,615 | B2 | 4/2008 | Salman et al. |
| 7,427,450 | B2 | 9/2008 | Raiser |
| 7,436,080 | B2 | 10/2008 | Hackle et al. |
| 7,494,729 | B2 | 2/2009 | Odaohhara |
| 7,688,071 | B2 | 3/2010 | Cheng et al. |
| 7,688,074 | B2 | 3/2010 | Cox et al. |
| 7,696,716 | B2 | 4/2010 | Siddiqui et al. |
| 7,806,095 | B2 | 10/2010 | Cook et al. |
| 7,832,513 | B2 | 11/2010 | Verbrugge et al. |
| 7,834,583 | B2 | 11/2010 | Elder et al. |
| 7,969,040 | B2 | 6/2011 | Conen et al. |
| 8,013,611 | B2 | 9/2011 | Elder et al. |
| 2002/0024322 | A1 | 2/2002 | Burke |
| 2002/0132164 | A1 | 9/2002 | Kaneko et al. |
| 2002/0145404 | A1 | 10/2002 | Dasgupta et al. |
| 2004/0053083 | A1 | 3/2004 | Kobayashi et al. |
| 2004/0112320 | A1 | 6/2004 | Bolz et al. |
| 2004/0164703 | A1 | 8/2004 | Berels |
| 2004/0201365 | A1 | 10/2004 | Dasgupta et al. |
| 2005/0029867 | A1 | 2/2005 | Wood |
| 2005/0035741 | A1 | 2/2005 | Elder et al. |
| 2005/0052155 | A1 | 3/2005 | Surig |
| 2005/0080641 | A1 | 4/2005 | Ronning et al. |
| 2005/0137764 | A1 | 6/2005 | Alvarez-Troncoso et al. |
| 2005/0224035 | A1 | 10/2005 | Burke et al. |
| 2005/0247280 | A1 | 11/2005 | Asada et al. |
| 2005/0279544 | A1 | 12/2005 | Pott et al. |
| 2005/0284676 | A1 | 12/2005 | King et al. |
| 2005/0285445 | A1 | 12/2005 | Wruck et al. |
| 2006/0098390 | A1 | 5/2006 | Ashtiani et al. |
| 2006/0127704 | A1 | 6/2006 | Raiser |
| 2006/0147770 | A1 | 7/2006 | Krause |
| 2006/0186738 | A1 | 8/2006 | Noguchi et al. |
| 2006/0201724 | A1 | 9/2006 | Leblanc |
| 2007/0050108 | A1 | 3/2007 | Larschan et al. |
| 2007/0090808 | A1 | 4/2007 | McCabe et al. |
| 2007/0159007 | A1 | 7/2007 | King et al. |
| 2007/0160901 | A1 | 7/2007 | Kaun |
| 2008/0013224 | A1 | 1/2008 | Kim et al. |
| 2008/0111508 | A1 | 5/2008 | Dasgupta et al. |
| 2008/0113226 | A1 | 5/2008 | Dasgupta et al. |
| 2008/0215200 | A1 | 9/2008 | Toth |
| 2009/0011327 | A1 | 1/2009 | Okumura et al. |
| 2009/0021216 | A1 | 1/2009 | Hills et al. |
| 2009/0050092 | A1 | 2/2009 | Handa et al. |
| 2009/0056661 | A1 | 3/2009 | Cook et al. |
| 2009/0317696 | A1 | 12/2009 | Chang |
| 2009/0322286 | A1 | 12/2009 | Chheda |
| 2010/0017045 | A1 | 1/2010 | Nesler et al. |
| 2010/0019737 | A1 | 1/2010 | Leboeuf |
| 2010/0233523 | A1 | 9/2010 | Jo et al. |
| 2010/0285702 | A1 | 11/2010 | Platon |
| 2010/0307847 | A1 | 12/2010 | Lungu et al. |
| 2011/0001353 | A1 | 1/2011 | Emerson et al. |
| 2011/0031046 | A1 | 2/2011 | Zolman et al. |
| 2011/0076530 | A1* | 3/2011 | Miyamoto et al. .............. 429/61 |
| 2011/0198929 | A1 | 8/2011 | Zhu et al. |
| 2011/0202216 | A1 | 8/2011 | Thai-Tang et al. |
| 2011/0238257 | A1 | 9/2011 | Tarnowsky et al. |

FOREIGN PATENT DOCUMENTS

| | | |
|---|---|---|
| CN | 101699590 A | 4/2010 |
| CN | 101719557 A | 6/2010 |
| DE | 20311494 U1 | 10/2003 |
| DE | 102006048872 A1 | 5/2008 |
| GB | 2452308 A | 3/2009 |
| JP | 2011009128 A | 1/2011 |
| JP | 2011071112 A | 4/2011 |
| WO | 8401475 | 4/1984 |
| WO | 2006045016 A2 | 4/2006 |
| WO | 2010091583 A1 | 8/2010 |

OTHER PUBLICATIONS

Lamonica, Martin; "Hybrid Storage Melds Battery, Ultracapacitor"; Green Tech—CNET News—CBS Interactive; pp. 1-2.
Bullis, Kevin; "Ultracaps Could Boos Hybrid Efficiency"; Technology Review—published by MIT; Thursday, Aug. 20, 2009; pp. 1-2.
Burke, Andrew F.; "Batteries and Ultracapacitors for Electric, Hybrid, and Fuel Cell Vehicles"; Simulations indicate that fuel-efficient hybrid-electric vehicles can be designed using either batteries or ultracapacitors and that the decision between the two technologies is dependent on their cost and useful life; IEEE; vol. 95, No. 4, Apr. 2007; pp. 806-820.

* cited by examiner

SYSTEMS AND METHODS FOR CONTROLLING MULTIPLE STORAGE DEVICES

CROSS REFERENCE TO RELATED APPLICATIONS

This application is a Non-Provisional Application of U.S. Provisional Patent Application No. 61/453,474, entitled "Combined Battery and Super Capacitor Systems for Vehicle Applications," filed Mar. 16, 2011, and U.S. Provisional Patent Application No. 61/508,621, entitled "System for Storage of Charge and Energy with an Integrated Controller," filed Jul. 16, 2011, and U.S. Provisional Patent Application No. 61/477,730, entitled "Multiple Battery System for Vehicle Applications," filed Apr. 21, 2011, and U.S. Provisional Patent Application No. 61/508,622, entitled "Differential State of Charge Battery for Improved Charging Capability," filed Jul. 16, 2011, which are herein incorporated by reference.

The present patent application is generally related to the following co-pending patent applications, which are hereby incorporated into the present application by reference: U.S. application Ser. No. 13/422,246, entitled "Energy Source Systems Having Devices with Differential States of Charge", filed by Ou Mao et al. on even date herewith; U.S. application Ser. No. 13/422,421, entitled "Energy Source Devices and Systems Having a Battery and An Ultracapacitor", filed by Junwei Jiang et al. on even date herewith; U.S. application Ser. No. 13/422,514, entitled "Energy Source System Having Multiple Energy Storage Devices", filed by Thomas M. Watson et al. on even date herewith; and U.S. application Ser. No. 13/422,621, entitled "Systems and Methods for Overcharge Protection and Charge Balance in Combined Energy Source Systems", filed by Junwei Jiang et al. on even date herewith.

FIELD

The invention relates generally to control methods and systems and, more particularly, to controllers for multiple storage device systems.

BACKGROUND

Electromechanical systems, such as vehicles and electrical networks for commercial, industrial, and residential buildings, often require electrical energy to power their operation. Accordingly, such electromechanical systems often receive power from one or more storage devices capable of providing electrical energy. Storage devices of this type that are suitable for providing electrical energy to the electromechanical system can typically be discharged and replenished with charge in multiple cycles before the life cycle of the storage device is depleted. In some instances, a single electromechanical system may receive power from more than one primary source of electrical energy. For example, certain vehicles, such as cars, motorcycles, and trucks, may utilize one or more storage devices, such as batteries, to provide power at a level sufficient for starting the internal combustion engine of the vehicle. Unfortunately, many inefficiencies currently exist in electromechanical systems that are serviced by multiple storage devices since the storage devices are providing energy to a single system.

SUMMARY

In one embodiment, a system includes a first storage device adapted to store and release electrical energy and a second storage device adapted to store and release electrical energy. The system also includes an electromechanical system coupled to the first storage device and the second storage device and adapted to generate an energy demand and to utilize electrical energy from at least one of the first storage device and the second storage device to fulfill the energy demand. The system also includes a controller coupled to the first storage device, the second storage device, and the electromechanical system. The controller is adapted to optimize operation of the system relative to a first parameter by controlling a flow of electric charge between the first storage device, the second storage device, and the electromechanical system. The controller controls the flow of electric charge by selectively controlling the amount of electrical energy that is received and released by each of the first storage device and the second storage device.

In another embodiment, controller for a storage system is provided. The controller is adapted to monitor a first parameter associated with a first storage device and a second parameter associated with a second storage device. The controller is also adapted to receive data corresponding to optimization criteria including one or more operational optimization parameters and to determine an optimal electric charge flow between the first storage device, the second storage device, and an electromechanical system based on the monitored first parameter and the monitored second parameter. The controller is also adapted to produce a control signal to control the flow of electric charge in a variable manner to and/or from the first storage device and the second storage device in accordance with the determined optimal electric charge flow.

In another embodiment, a system includes a first storage device adapted to store and release electrical energy and a second storage device adapted to store and release electrical energy. The system also includes a controller coupled to the first storage device, the second storage device, and a load. The controller is adapted to optimize operation of the system relative to a first system parameter by controlling the channeling of electric charge in a variable manner between the first storage device, the second storage device, and the load.

DRAWINGS

Figure 1:
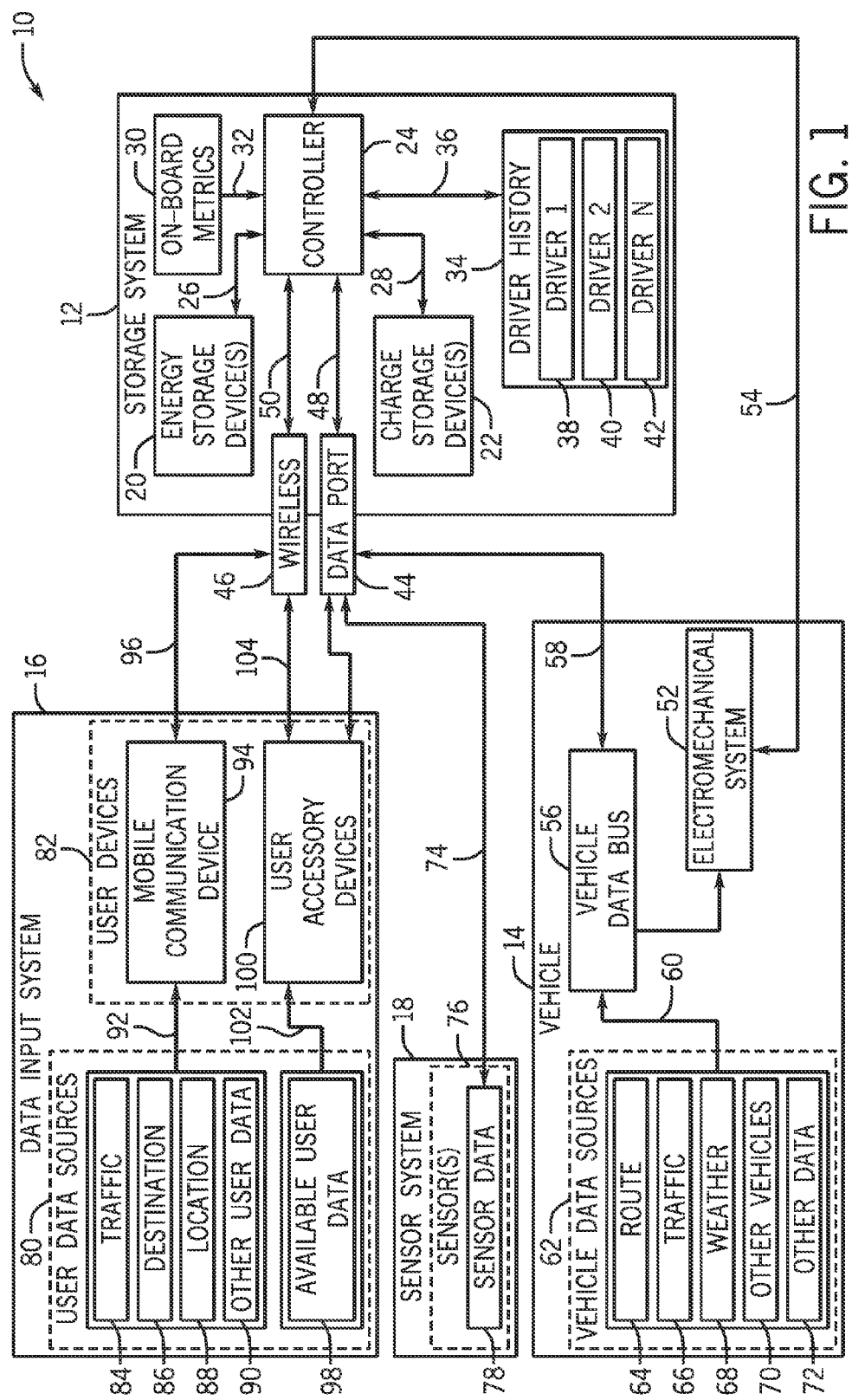
FIG. 1 is a block diagram illustrating an embodiment of a storage system including a controller capable of coordinating operation of an energy storage device and a charge storage device.
Figure 5:
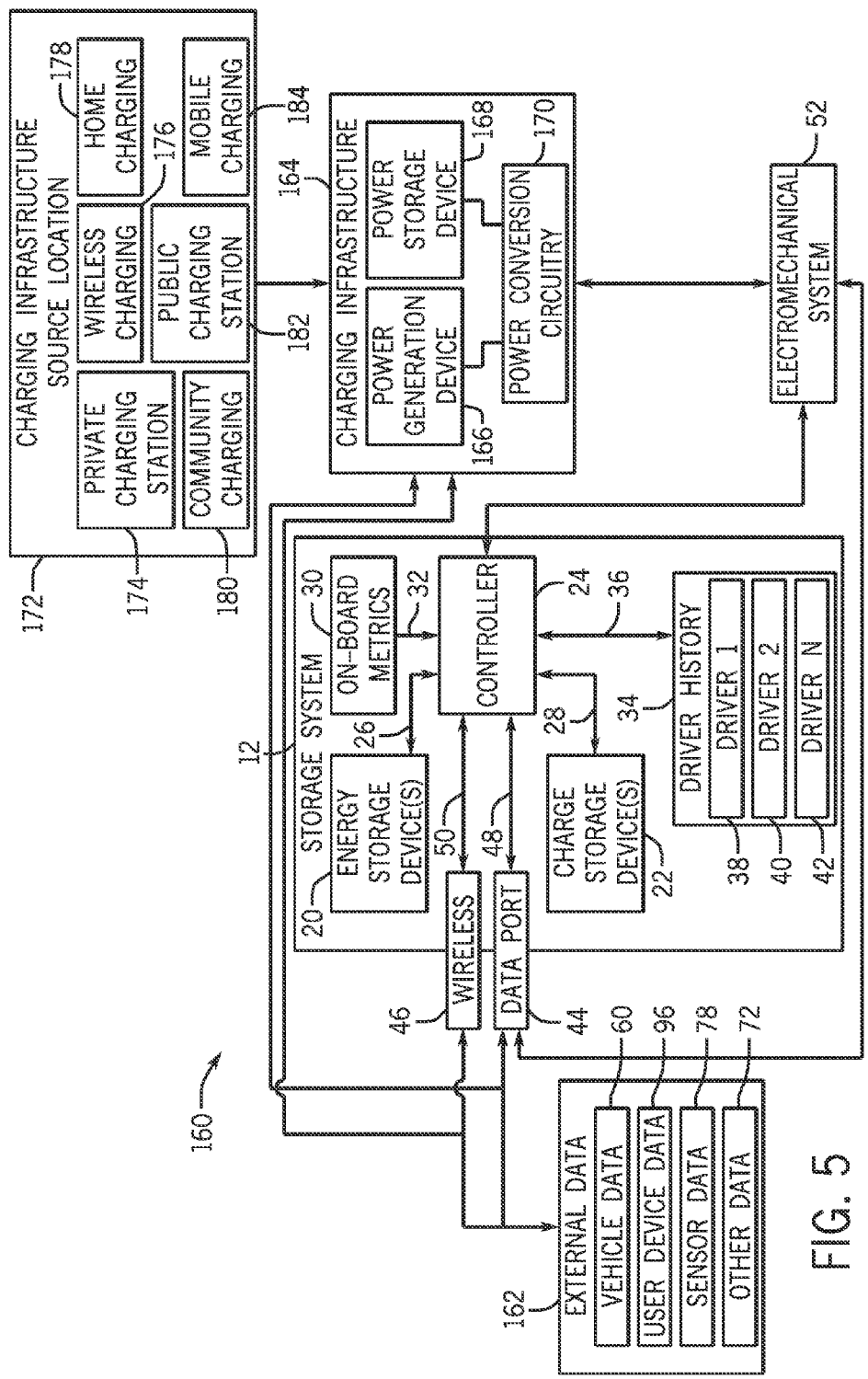
Figure 6:
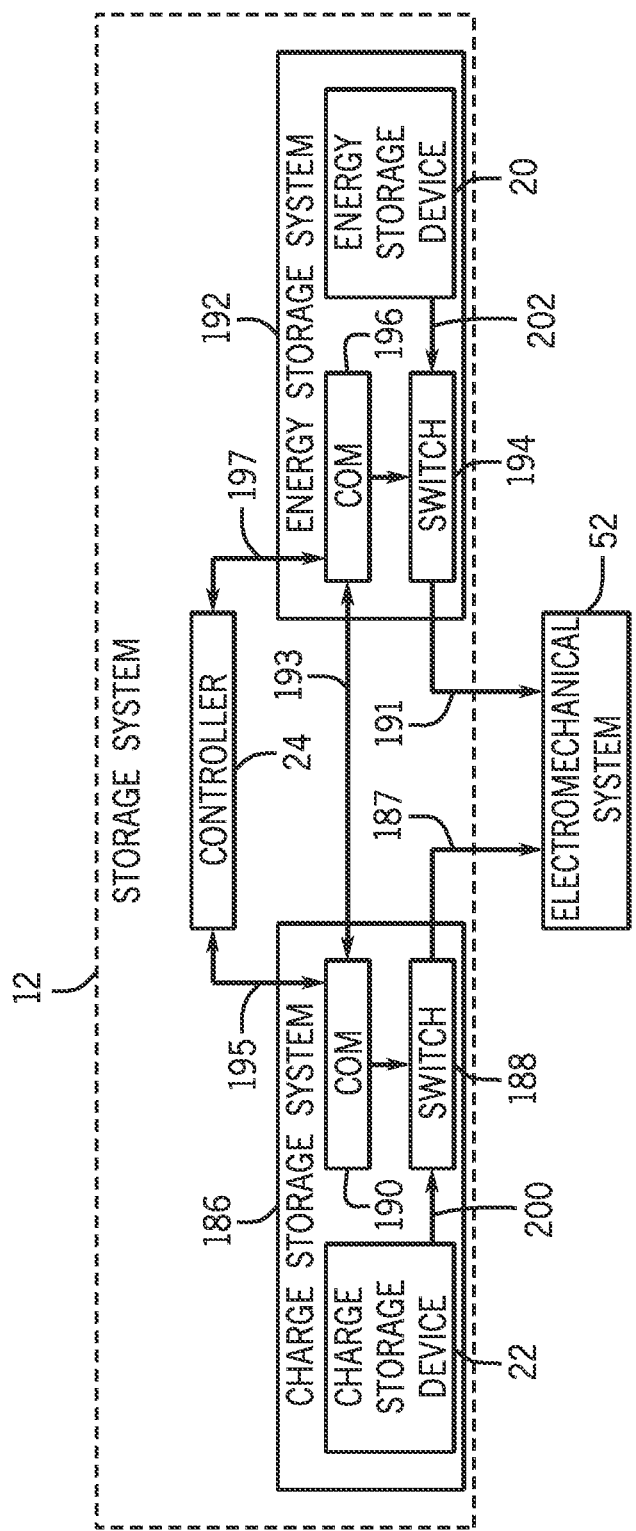

FIG. 5 illustrates an embodiment of the controller of FIG. 1 that is capable of exhibiting control over a system to reduce or minimize the monetary cost associated with operation of an electrified vehicle system; and FIG. 6 illustrates an embodiment of the storage system of FIG. 1 in which the controller coordinates control between the charge storage device, the energy storage device, and the electromechanical system.

Figure 7:
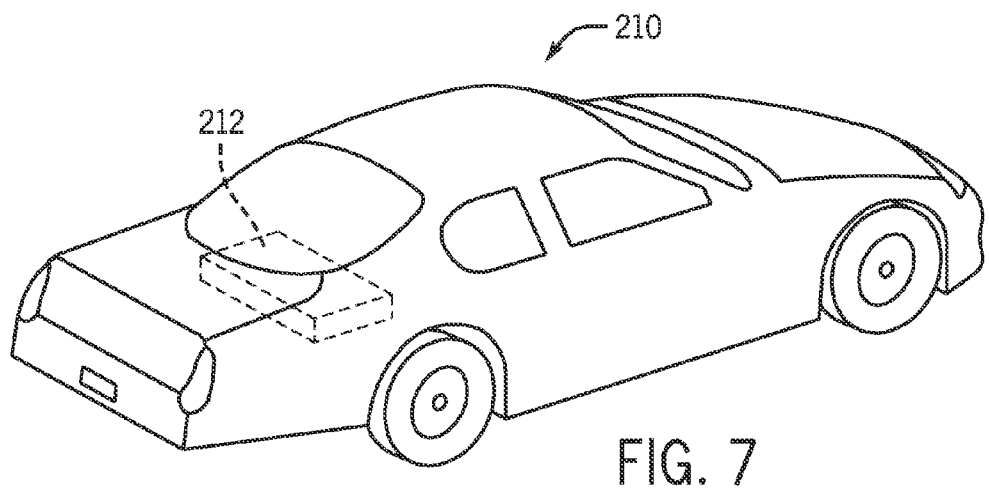
Figure 8:
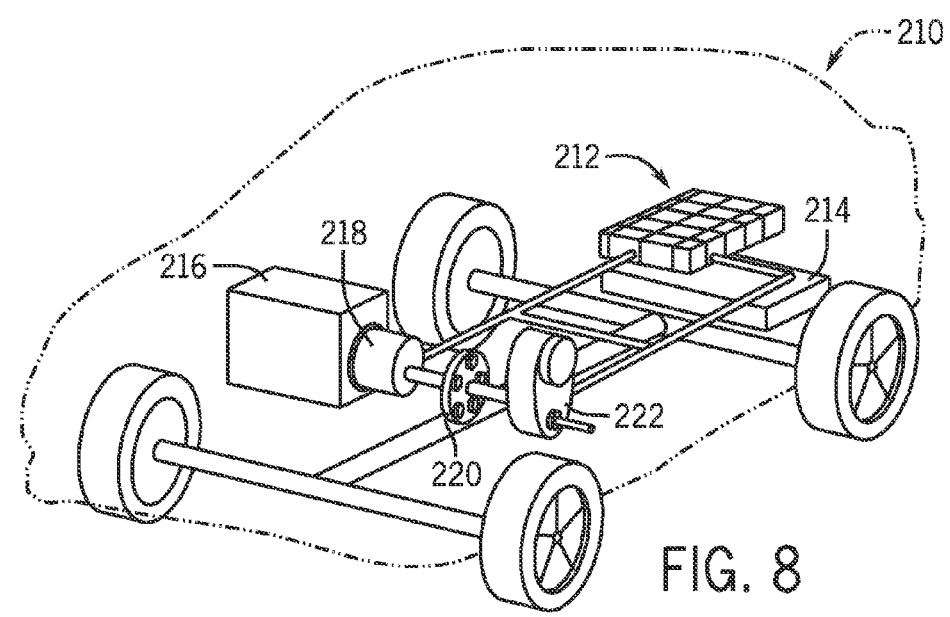

FIG. 7 is perspective view of an embodiment of a vehicle having a battery module or system for providing all or a portion of the motive power for the vehicle; and FIG. 8 illustrates a cutaway schematic view of an embodiment of the vehicle of FIG. 7 provided in the form of a hybrid electric vehicle.

DETAILED DESCRIPTION

As described in more detail below, provided herein are embodiments of a storage system including a plurality of storage devices and a controller capable of controlling the plurality of storage devices to optimize one or more desired parameters. It should be noted that in presently disclosed embodiments, when a parameter or multiple parameters are discussed, it should be understood that a single parameter, multiple parameters, or any combination of such parameters may be utilized by the controller. In certain embodiments, the plurality of storage devices may include one or more energy storage devices, charge storage devices, or any combination thereof. As such, as used herein, the term "storage device" refers to any device capable of storing energy and/or charge. For example, in some embodiments, the storage devices may include but are not limited to charge storage devices such as capacitors, ultracapacitors, a capacitive electrode coupled to or contained within an energy storage device, and so forth. Further, in certain embodiments, the storage devices may include but are not limited to energy storage devices such as electrochemical storage devices (e.g., lithium-based batteries, nickel-based batteries, lead-based batteries, etc.), fuel cells, or any other suitable material or device capable of storing energy. Additionally, it should be noted that when used herein, the terms "storage device," "energy storage device," and "charge storage device" may correspond to one or more of such devices and, accordingly, may refer to a single device or a plurality of such devices coupled together. Therefore, as used herein, when reference is made to a first storage device, a second storage device, and so forth, such devices may be utilized alone or together in any desired combination. For example, in one embodiment, the energy or charge storage device may be a bank of capacitors or batteries configured to cooperatively function.

Moreover, it should be noted that, as will be appreciated by those skilled in the art, distinctions exist between "charge" and "energy", both physically and in terms of unitary analysis. In general, charge will be stored and energy converted during use. However, in the present context, the two terms will often be used somewhat interchangeably. Thus, at times reference is made to "charge storage" or to "the flow of charge", or to similar handling of "energy". This use should not be interpreted as technically inaccurate or limiting insomuch as the batteries, ultracapacitors, and other devices and components may be said, in common parlance, to function as either energy storage devices or charge storage devices, and sometimes as either or both.

Presently disclosed embodiments of the controller may be capable of controlling the flow of electric charge to and/or from the plurality of storage devices to improve or optimize one or more desired parameters. For example, in one embodiment, the storage system may be coupled to an electromechanical system, such as a vehicle, and the operation of the storage system may be controlled to improve the fuel efficiency of the vehicle. For further example, in another embodiment, the controller may monitor characteristics of the storage devices and data corresponding to operational parameters of the electromechanical system or a user of the system and may control electric charge flow in a variable manner from the storage system based on the received data. Indeed, a variety of implementation-specific control schemes may be employed by the provided controller to variably control the flow of electric charge between components of the storage system and the electromechanical system to improve or optimize one or more desired parameters. For example, the flow of electric charge between components may be controlled such that two storage devices are concurrently receiving or releasing energy in the amount and at the rate dictated by the controller. As such, as described in detail below, provided herein are embodiments of a cooperative energy and charge storage system having an integrated controller capable of controlling devices in the system to improve or optimize system performance.

It should be noted that the controller described herein is suitable for use with any of a variety of suitable multiple storage device systems. In one embodiment, embodiments of the controller may be utilized to control a storage device including a capacitive device and a battery device enclosed in a single enclosure, such as the systems described in the co-pending application entitled "ENERGY SOURCE DEVICES AND SYSTEMS HAVING A BATTERY AND AN ULTRACAPACITOR," which is hereby incorporated by reference, as mentioned above. Additionally, it should be noted that the controller described herein may be configured as a retrofit device suitable for use, for example, with a pre-existing vehicle or a pre-existing battery.

Turning now to the drawings, FIG. 1 illustrates an embodiment of a system 10 including a storage system 12, a vehicle 14, a data input system 16, and a sensor system 18. The storage system 12 includes one or more energy storage devices 20, one or more charge storage devices 22, and a controller 24 capable of controlling the storage devices 20 and 22 to improve or optimize one or more desired parameters in accordance with received inputs. To that end, the controller 24 is communicatively and electrically coupled to the energy storage device 20 and the charge storage device 22, as represented by arrows 26 and 28, respectively. Such connections may enable the controller 24 to monitor one or more parameters of the storage devices 20 and 22 as well as transfer electrical energy in a variable manner between the energy storage device 20, the charge storage device 22, and/or other components of the system 10. As such, the controller 24 may increase the efficiency of the system 10 by integrating and coordinating control of the multiple storage device system 10.

As noted above, in some embodiments, the energy storage devices 20 and the charge storage devices 22 may take on one or more of a variety of suitable forms. For example, the energy storage device 20 may be one or more of a battery (e.g., lithium-based, nickel-based, lead-based, etc.), a fuel cell, any suitable electrochemical storage device, or any other material or device capable of storing energy. Additionally, in some embodiments, the charge storage device 22 may be one or more of a capacitor, a capacitive electrode attached to or contained in an energy storage device, or any other suitable material or device capable of storing charge. For further example, the charge storage device 22 may include a capacitive electrode coupled to or contained in one or more of a carbon electrode, a lead/carbon composite electrode, an electrode containing lithium and carbon, an electrode containing titanium, or any other suitable electrode with capacitive characteristics.

During operation of the system 10, the controller 24 receives a variety of implementation-specific inputs and utilizes the inputs to coordinate control of the system 10. For example, in the illustrated embodiment, the controller 24 receives a variety of inputs from components within the storage system 12, such as a variety of on-board metrics 30 represented by arrow 32 and a user history profile 34 that corresponds to the profiles of a plurality of users 38, 40, and 42, as represented by arrow 36. In the illustrated embodiment, the storage system 12 is coupled to the vehicle 14 and, accordingly, the user history profile 34 corresponds to the driving profiles of the plurality of drivers 38, 40, and 42. That is, the user history profile 34 may include data that corresponds to the driving habits (e.g., average speed driven, aggressive or non-aggressive driving profile, frequently or infrequently brakes, etc.) of one or more possible drivers of the vehicle 14. However, in other embodiments, the storage system 12 may be coupled to another type of system that utilizes an electrical energy source, and the user profiles may correspond to the particular type of user that utilizes the given system.

Additionally, the controller 24 may receive inputs from components of the system 10, such as from the data input system 16, the sensor system 18, and the vehicle 14, for example, via data port 44 and/or wireless connection 46, as represented by arrows 48 and 50, respectively. Communication with the various data sources may be performed, for example, by a wired connection at the data port 44 having a vehicle data bus (e.g., a controller area network (CAN) bus, an on board diagnostic system, etc.), an IP network, or any other suitable physical connection. Alternatively, or in addition to the data port communication, the communication with the data sources may be performed via the wireless connection 46, for example, through Bluetooth, 802.1x, a cellular connection, radio frequency identification (RFID) communication, or any other suitable wireless connection. Accordingly, it should be noted that although wireless communication (e.g., block 46) and wired communication (e.g., block 44) are illustrated in FIG. 1, in other embodiments, one or both forms of communication may be employed to transfer data between system components. Moreover, it should be understood that the data may originate in any of the components coupled in the system and capable of generating, receiving, and/or storing useful data. The data may originate from a few as a single device, or multiple devices may provide data, at least during some period of operation of the system.

In the illustrated embodiment, the controller 24 controls the supply of electric charge to the electromechanical system 52 located in the vehicle 14, as indicated by arrow 54. As shown, the vehicle 14 also includes a vehicle data bus 56 that communicates with the controller 24 via the data port 44, as indicated by arrow 58. The vehicle data bus 56 receives data 60 regarding operation of the vehicle 14 from a plurality of vehicle data sources 62. The vehicle data sources 62 may include but are not limited to vehicle route 64, traffic information 66, weather information 68, information corresponding to parameters of other vehicles 70, and any other relevant data 72. The vehicle data sources 62 may originate, for example, in a global positioning system (GPS) associated with the vehicle 14. Data from the vehicle data sources 62 is communicated to the controller 24 via the vehicle data bus 56 and may be utilized by the controller 24 to determine the optimal balance of electric charge flow between the energy storage device 20, the charge storage device 22, and the electromechanical system 52.

In some embodiments, the vehicle 14 may be an electric vehicle (EV), a hybrid electric vehicle (HEV), a plug-in hybrid electric vehicle (PHEV), or any other type of vehicle using electric power for propulsion (collectively referred to as "electric vehicles"). Additionally, the type of the vehicle 14 may be implementation-specific, and, accordingly, may differ between various embodiments, all of which are intended to fall within the scope of the present disclosure. For example, the vehicle 14 may be a truck, bus, industrial vehicle, motorcycle, recreational vehicle, boat, or any other type of vehicle that may benefit from the use of electric power for all or a portion of its propulsion power. It should also be noted, however, that the present techniques also apply to storage and use of energy in vehicles that do not use or sometimes use electrical energy for propulsion. For example, such vehicles may include conventional internal combustion engines used for propulsion, or vehicles that may employ regenerative braking, but not use the resulting energy directly for propulsion. Moreover, the techniques may be particularly advantageous in any vehicle in certain use cases. For example, in so-called stop-start applications the vehicle engine or prime mover may be shut off at certain times (e.g., when stopped at an intersection) and restarted each time, resulting in a need for starting energy. Finally, it should be noted that the techniques may be advantageous for any of a range of cases both vehicular and non-vehicular, such as for driving accessories, electrical loads, and so forth.

In the illustrated embodiment, the electromechanical system 52 is part of the vehicle 14. However, it should be noted that the system 10 of FIG. 1 is merely an example. In other embodiments, the electromechanical system 52 may instead be part of another suitable type of system, such as a building electrical network and attached devices, including residential, commercial, and/or industrial systems. In such embodiments, the controller 24 may be capable of coordinating the flow of electric charge between the storage devices 20 and 22 and the electromechanical system of the given electrical network.

Still further, the controller 24 may utilize inputs 74 received from the sensor system 18 via data port 44 to improve or optimize system performance 10 by exhibiting control over the electric charge flow between system components. As shown, the sensor system 18 may include one or more sensors 76 that measure a desired parameter and generate sensor data 78 corresponding to the measurement values. This sensor data 78 may then be communicated to the controller 24, for example, at discrete time points during operation, continuously throughout operation, or in any other desired way. The sensors 76 included in the sensor system 18 may include but are not limited to temperature sensors, humidity sensors, or any other suitable sensor capable of measuring a relevant operational parameter.

Additionally, the controller 24 may receive inputs from the data input system 16, which includes user data sources 80 and user devices 82 in the illustrated embodiment. As shown, the user data sources include information pertaining to traffic 84, the user's destination 86, the user's location 88, and any other pertinent user data 90. This information is communicated via input 92 to a mobile communication device 94 for transfer to the controller 24, as indicated by arrow 96. Further, any additional implementation-specific user data 98 that is available may be communicated to the controller 24 via one or more user accessory devices 100, as indicated by arrows 102 and 104.

As noted above, during operation of the system 10, the controller 24 improves or optimizes the performance of the system by exhibiting control over the energy storage device 20 and the charge storage device 22 in accordance with the received inputs. The controller 24 utilizes data received from both within the storage system 12, such as data regarding internal characteristics of the energy storage device 20 and/or the charge storage device 22, as well as data acquired from external sources, such as from the vehicle 14, the sensor system 18, and/or the data input system 16. Subsequently, system improvement or optimization may be performed relative to one or more criteria, which may include, but are not limited to power output, total monetary cost of operation, fuel efficiency, the lifetime of energy storage device 20 and/or the charge storage device 22, or any other desired criterion. In certain embodiments, the criteria may be selected at the time of manufacture, vehicle service, operation, or at any other desired time point and, once selected, the controller 24 may operate to control the proper flow of electric charge between the energy storage device 20, the charge storage device 22, and the other system components as defined by the improvement or optimization process.

Figure 2:
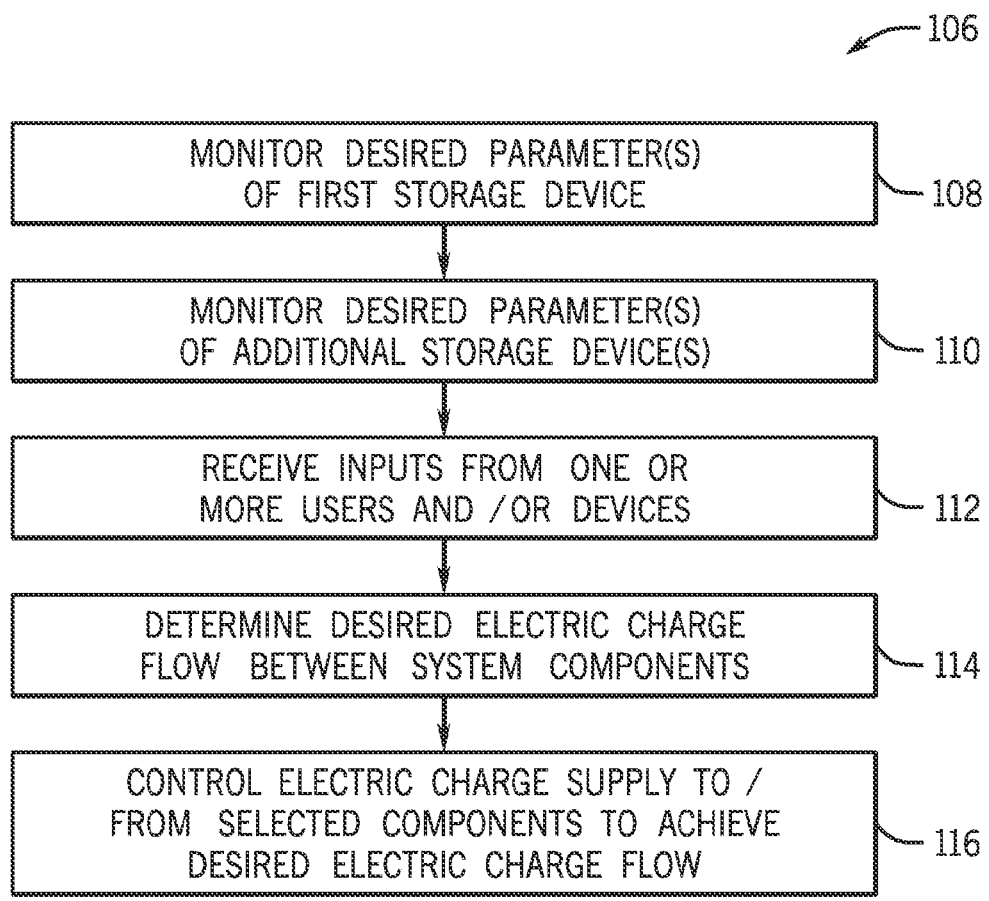
FIG. 2 illustrates an embodiment of a method that may be employed by the controller of FIG. 1 to improve or optimize system performance in accordance with a desired criteria.

FIG. 2 illustrates an embodiment of a method 106 that may be employed by the controller 24 to improve or optimize performance of the system 10 in accordance with the desired criteria. As shown, the method 106 includes monitoring one or more parameters of the first storage device (block 108) and monitoring one or more parameters of any additional storage devices (block 110). For example, these steps may include monitoring operational or state parameters of the energy storage device 20 and the charge storage device 22. For further example, in embodiments that include a plurality of storage devices, the method 106 provides for monitoring of the desired parameters of each of those storage devices or monitoring a parameter of one or more groups of such devices, such as the energy capacity remaining in a bank of batteries.

The method 106 proceeds by receiving inputs from one or more users and/or devices (block 112). For example, the controller 24 may receive inputs from a mobile data source that communicates traffic data, vehicle destination data, user location data, or any other suitable type of data to the controller 24. For further example, the controller 24 may receive inputs from the sensors 76, a vehicle's navigation system, a user, and so forth. The controller 24 may then proceed to determine an appropriate electric charge flow between components of the system (block 114) and to control the electric charge flow between the electric charge supplies and the other system components to achieve the desired electric charge flow (block 116). In this way, the controller 24 may utilize the method 106 to both monitor system components and control operation of those components to achieve and improved or optimized balance of electric charge flow within the system. Operation of the system 10 may be improved or optimized with respect to any of a variety of suitable parameters, such as monetary cost or storage device life, as described in detail below. However, it should be noted that the improvement or optimization parameters illustrated and described below are merely examples, and the controller may be capable of utilizing a variety of other known parameters to improve or optimize system performance, not limited to those described herein.

Figure 3:
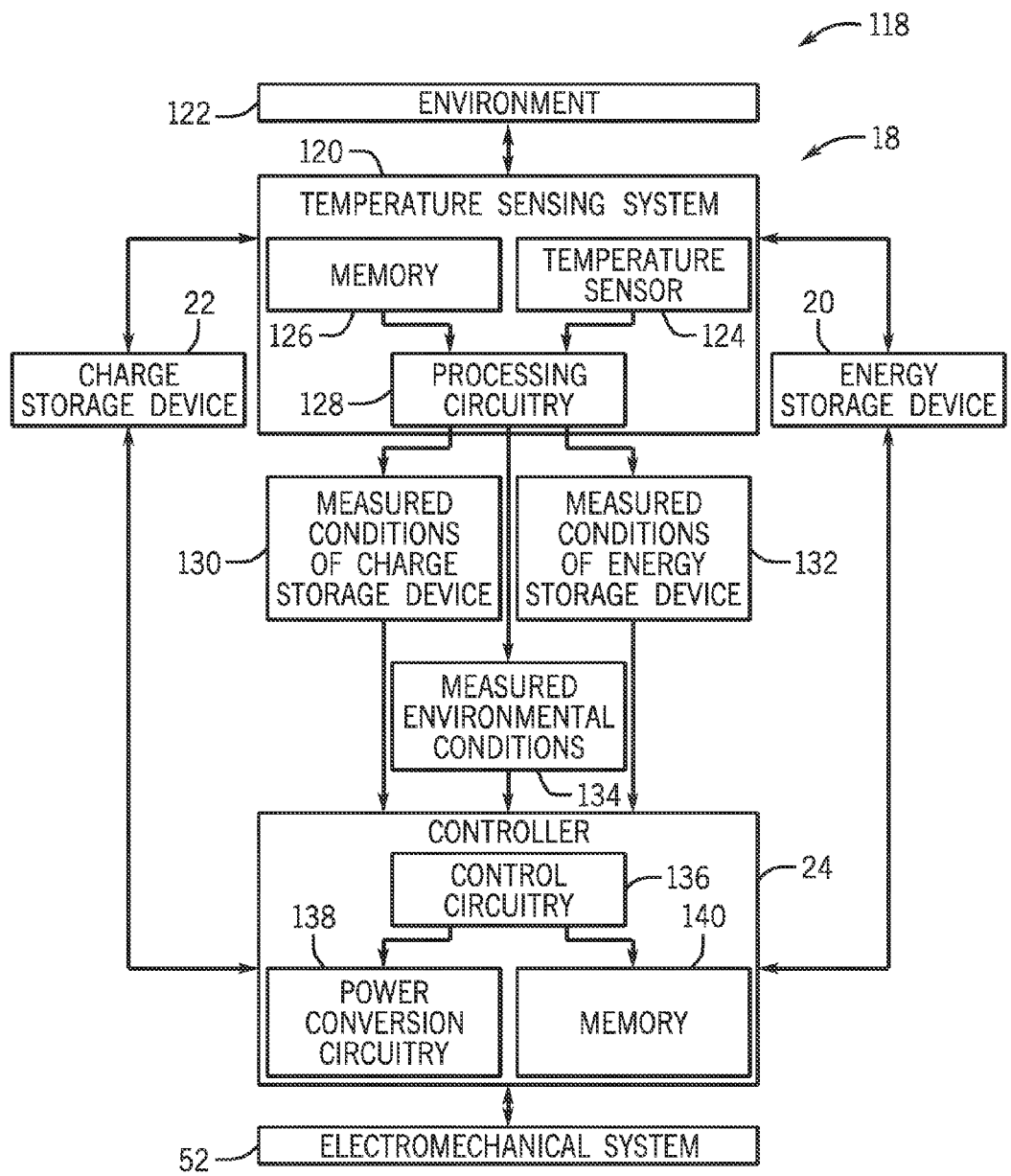
FIG. 3 illustrates an embodiment of the controller of FIG. 1 that is capable of exhibiting control over a system based on feedback received from a temperature sensing system.

FIG. 3 illustrates an embodiment of the controller 24 that is capable of exhibiting control over the system 118 based on feedback received from a temperature sensing system 120. As shown, the system 118 includes the temperature sensing system 120 that monitors the temperature of the charge storage device 22, the energy storage device 20, and a surrounding environment 122. The temperature sensing system 120 includes a temperature sensor 124 and memory 126 coupled to processing circuitry 128. The memory 126 may include volatile or non-volatile memory, such as read only memory (ROM), random access memory (RAM), magnetic storage memory, optical storage memory, or a combination thereof. Furthermore, a variety of control parameters may be stored in the memory along with code configured to provide a specific output (e.g., communicate a signal to the controller at a number of discrete time points during operation, continuously transmit measured information, etc.) during operation of the temperature sensing system 120.

The system 118 also includes examples of possible outputs 130, 132, and 134 generated by the processing circuitry 128 and transmitted to the controller 24. In this embodiment, the controller 24 includes control circuitry 136, power conversion circuitry 138, and memory 140. The controller 24 is communicatively and electrically coupled to the charge storage device 22, the energy storage device 20, and the electromechanical system 52, thereby enabling the controller 24 to control the flow of electric charge between these devices in accordance with the temperature feedback received from the temperature sensing system 120.

During operation of the illustrated system 118, the temperature sensor 124 measures the respective temperatures of the charge storage device 22, the energy storage device 20, and the environment 122 and communicates the measurements to the processing circuitry 128. It should be noted that the temperature sensor 124 may be controlled in accordance with one or more inputs or control regimes. For example, the temperature sensor 124 may be controlled to acquire measurements at discrete time points or continuously throughout the operation of the system 118. The processing circuitry 128 receives inputs from the temperature sensor 124 and utilizes these inputs to output the signals 130, 132, and 134 corresponding to the measured conditions of the charge storage device 22, the measured conditions of the energy storage device 20, and the measured environmental conditions. In some embodiments, the processing circuitry 128 may store inputs from the temperature sensor 124 to the memory 126 for later retrieval. For example, in one embodiment, the temperature sensor 124 may acquire data continuously, but the processing circuitry 128 may periodically reference the memory to provide the signals 130, 132, and 134 at discrete time points.

The signals 130, 132, and 134 are received and processed by the control circuitry 136 in the controller 24. The control circuitry 136 utilizes the temperature data to determine the proper electric charge flow between the charge storage device 22, the energy storage device 20, and the electromechanical system 52. To that end, the control circuitry 136 may reference the memory 140, for example, to retrieve a control algorithm that is consistent with the acquired temperature measurements. Additionally, the control circuitry 136 controls the power conversion circuitry 138 to receive electrical inputs from the devices 22, 20, and 52 and to convert the received inputs into outputs appropriate for use in the receiving device.

For example, in one embodiment, the control circuitry 136 monitors the electrical demand from the electromechanical system 52 as well as the temperatures of the storage devices 20 and 22 and improves or optimizes the operating conditions of the storage devices 20 and 22 while meeting the electrical demand from the electromechanical system 52. For example, in one embodiment, the controller may utilize logic that improves the likelihood that sufficient charge is available from the charge storage device 22 to start a vehicle (of which the electromechanical system 52 is a part), either alone or with assistance from the energy storage device 20. The foregoing controller logic may be utilized, for example, for low temperature applications in which the amount of charge necessary is a function of temperature.

Still further, in additional embodiments, such as high temperature applications, the particular controller logic that is implemented may be chosen by the control circuitry 136 such that the structural and/or chemical integrity of the energy storage device 20 is substantially maintained or such that the likelihood that the integrity of the energy storage device 20 being compromised is reduced or eliminated. In such a way, the controller 24 may take into account the temperature and condition of the storage devices 20 and 22 to reduce or prevent the likelihood that the system 118 may become inoperable due to the presence of storage devices having damaged or compromised structural, electrical, or chemical integrity.

Additionally, in certain embodiments, the controller 24 may control the operation of the storage devices 20 and 22 such that the lifetime of one or more of the devices 20 and 22 matches an expected lifetime. For example, in one embodiment, the energy storage device 20 may be a battery having a warranty period, and the controller 24 may control the lifetime of the battery to be approximately equal to the warranty period. For further example, the controller 24 may control the lifetime of one or more of the storage devices to meet a consumer expectation of how long the device should last. Indeed, it should be noted that in certain embodiments, the controller 24 may tailor the lifetime of each of the storage devices to match a desired lifetime, which may be dictated by a variety of implementation-specific factors.

Figure 4:
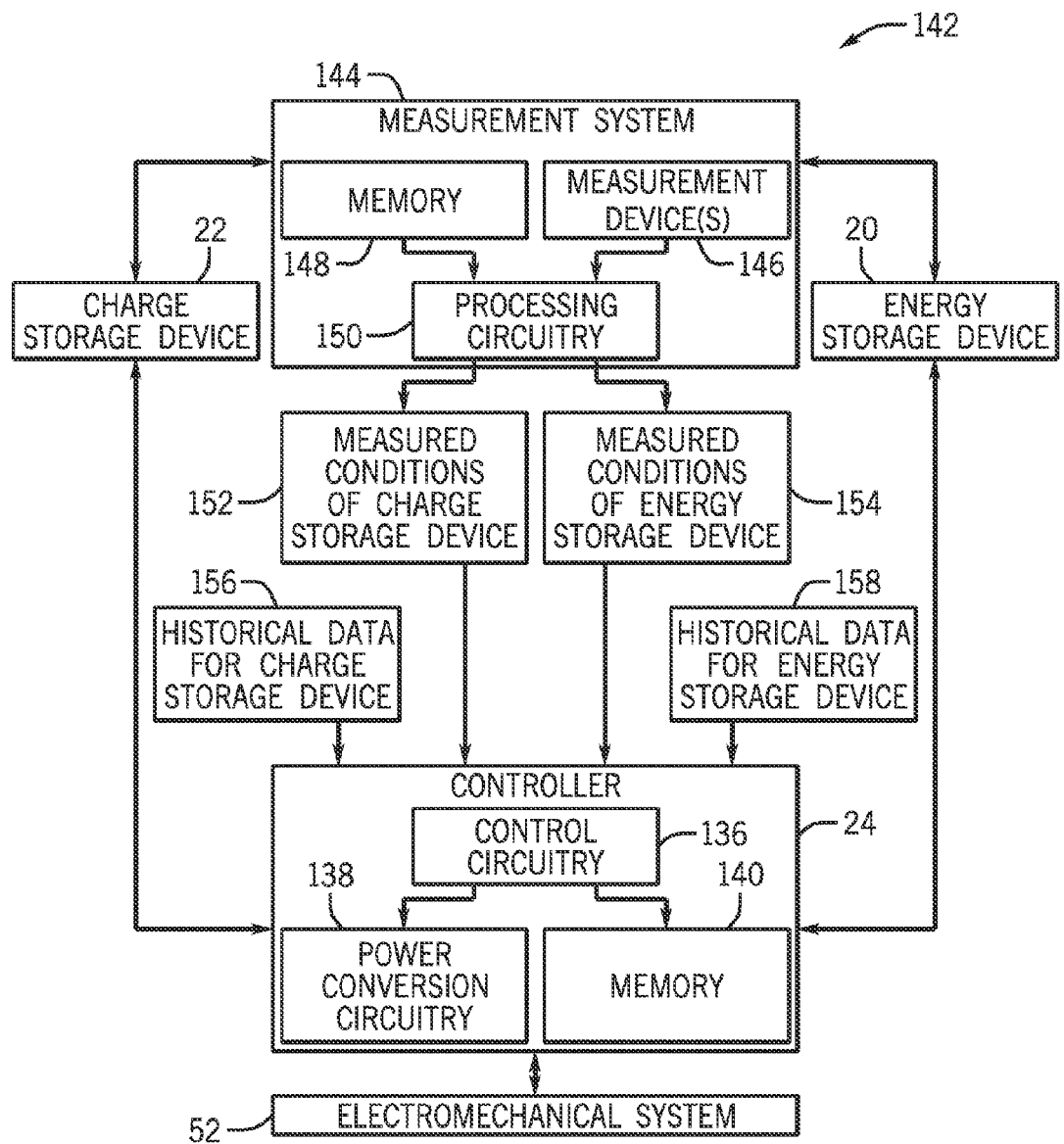
FIG. 4 illustrates an embodiment of the controller of FIG. 1 that is capable of exhibiting control over a system based on feedback received from a measurement system.

FIG. 4 illustrates an embodiment of the controller 24 that is capable of exhibiting control over the system 142 based on feedback received from a measurement system 144. As illustrated, the system 142 includes the measurement system 144 that measures one or more parameters of the charge storage device 22 and/or the energy storage device 20. For example, the measurement system 144 may measure parameters relating to the performance and/or state of charge of each of the storage devices. For further example, in one embodiment, the charge storage device 22 may be a capacitor, an ultracapacitor, and/or a bank of capacitive devices. In such an example, the measurement system 144 may obtain and process information relating to the state of health of the capacitive device, such as the internal impedance, total capacity, kinetics of charge acceptance, voltage stability versus time profile, state of charge, internal pressure, open circuit voltage, or a combination thereof. Further, the measurement system 144 may measure parameters such as voltage and temperature to determine the state of charge, capacity retention as a function of time, power density fade, a combination thereof, or any other suitable parameter.

To obtain measured information, the measurement system 144 includes one or more measurement devices 146 and memory 148 coupled to processing circuitry 150. The memory 148 may include volatile or non-volatile memory, such as read only memory (ROM), random access memory (RAM), magnetic storage memory, optical storage memory, or a combination thereof. Furthermore, a variety of control parameters may be stored in the memory along with code configured to provide a specific output (e.g., communicate a signal to the controller at a number of discrete time points during operation, continuously transmit measured information, etc.) during operation of the measurement system 144.

The system 142 also includes examples of possible outputs 152 and 154 generated by the processing circuitry 150 and transmitted to the controller 24. As shown, the processing circuitry 150 may communicate one or more measured conditions of the charge storage device (block 152) and/or one or more measured conditions of the energy storage device (block 154) to the controller 24. Additionally, historical data relating to the charge storage device (block 156) and historical data relating to the energy storage device (block 158) are also received by the control circuitry 136 of the controller 24. In the illustrated embodiment, the historical data 156 and 158 is shown as originating external to the controller 24. However, in some embodiments, the historical data 156 and 158 may be stored in and retrieved from, for example, the memory 140 within the controller 24.

In the illustrated embodiment, as before, the controller 24 is communicatively and electrically coupled to the charge storage device 22, the energy storage device 20, and the electromechanical system 52, thereby enabling the controller 24 to control the flow of electric charge between these devices in accordance with the measurement feedback received from the measurement system 144. In one embodiment, the controller 24 may operate to improve or optimize the operating conditions of the energy storage device 20, the charge storage device 22, or a combination thereof. For example, the controller 24 may implement control logic such that the charge storage device 22 is utilized by the system 142 as the primary electric charge source during high rate charge and discharge applications, and that the energy storage device 20 is utilized by the system 142 as the primary electric charge source for extended use, low rate charge and discharge applications. Further, in some embodiments, the controller 24 may improve or optimize operating conditions to substantially maintain availability of charge in the charge storage device 22.

Still further, in certain embodiments, the controller 24 may utilize the historical data 156 and 158 for the charge storage device and the energy storage device to further improve or optimize performance of the system 142. For instance, the controller 24 may utilize the historical information 156 and 158 to estimate the likelihood that a reduction will occur in the integrity of the energy storage device as a function of operating conditions (e.g., current output). Additionally, in another embodiment, the controller 24 may utilize the historical information 156 and 158 to estimate the likelihood that an opportunity to recharge the charge storage device will occur before another energy discharge from the device is needed. Additionally, the controller 24 may utilize the historical information 156 and 158 either alone or in combination with the measured conditions 152 and 154 and/or the current operating conditions (e.g., charge/discharge rate, temperature, etc.) to reduce or eliminate the likelihood that the structural, chemical, or electrical integrity of the energy storage device 20 and/or the charge storage device 22 will be compromised during operation.

FIG. 5 illustrates an embodiment of the controller 24 that is capable of exhibiting control over the system 160 to reduce or minimize the monetary cost associated with operation of an electrified vehicle system. As such, in the illustrated embodiment, the electromechanical system 52 may be part of an electric vehicle. That is, the electromechanical system 52 may be part of a vehicle propelled in whole or in part by electric charge, and recharging of the system may occur via transfer of electric charge from an engine and/or from an outside source of electric charge, and received external data 162 may correspond to data relevant to operation of an electric vehicle.

As shown, the system 160 includes the storage system 12 as well as a charging infrastructure 164. The charging infrastructure 164 includes a power generation device 166, a power storage device 168, and power conversion circuitry 170. As shown, the charging infrastructure source location 172 may be at a variety of suitable locations, such as a private charging station 174, a wireless charging station 176, a home charging station 178, a community charging station 180, a public charging station 182, a mobile charging station 184, or any other suitable charging station.

In the illustrated embodiment, during operation, the energy and charge storage devices 20 and 22 communicate with the charging infrastructure 164 via the controller 24 to reduce or minimize the monetary cost of energy used by the electric vehicle. This communication may occur, for example, during operation of the electric vehicle (e.g., when the vehicle is being utilized by an operator for transportation) or when the vehicle is coupled to the charging infrastructure 164. In some embodiments, in order to reduce or minimize the monetary cost of energy, the controller 24 may utilize the external data 162 to determine whether to acquire electric charge from the electrical grid at any given time. As such, in this embodiment, the other data 72 received by the controller 24 may include information regarding current electrical prices, past electrical prices, time of day, time of week, time of month, time of year, the state of charge of the storage devices, the driver history 34, a combination thereof, or any other relevant information. Once the controller 24 makes a determination as to the appropriate amount of needed energy and the time at which the energy will be acquired, the controller 24 communicates this determination to the charging infrastructure 164 and the needed energy is transferred to the storage system 12, for example, via power conversion circuitry 170.

In some embodiments, in order to coordinate operation between the charge storage device 22 and the energy storage device 20, the storage system 12 may include infrastructure that facilitates internal communication. FIG. 6 illustrates an embodiment of the storage system 12 in which the controller 24 coordinates control between the charge storage device 22, the energy storage device 20, and the electromechanical system 52. In the illustrated embodiment, the storage system 12 includes a charge storage system 186 including the charge storage device 22, a switch 188, and a communication device 190. Similarly, the storage system 12 also includes an energy storage system 192 including the energy storage device 20, a switch 194, and a communication device 196.

In the illustrated embodiment, the charge storage system 186 and the energy storage system 192 communicate directly with the electromechanical system 52 while remaining in communication with and under the control of the controller 24. Further, as indicated by arrow 193, the charge storage system 186 and the energy storage system 192 communicate with one another via the communication devices 190 and 196. However, it should be noted that in other embodiments, the control and electrical connections between the storage devices 20 and 22 and the electromechanical system 52 may be established through the controller 24. Nevertheless, in the illustrated embodiment, during operation, electric charge or energy is directed from the charge and energy storage devices 22 and 20, as indicated by arrows 200 and 202, and to the switches 188 and 194, which transfer the electric charge or energy in a variable manner into the electromechanical system 52, as indicated by arrows 187 and 191 and dictated by the controller 24. That is, the controller 24 may optimize system operation relative to a desired parameter by controlling the channeling of electric charge or energy in a variable manner between the first storage device, the second storage device, and the load (e.g., the electromechanical system). To that end, the controller 24 communicates control signals to the communication devices 190 and 196, as indicated by arrows 195 and 197, to effectuate the desired transfer of energy throughout the system. Further, measurement and control signals are also transferred from each communication device 190 or 196 to its associated switch 188 or 194.

Further, the switches 188 and 194 may be utilized to communicate measurement and control data to each of the energy storage system 192 and the charge storage system 186. It should be noted that in another embodiment, the switches 188 and 194 may not be located within the storage systems 186 and 192, but rather, the switches 188 and 194 may be configured as standalone units that connect to the charge storage system 186 and the energy storage system 192, respectively. Still further, during operation of the storage system 12, the communication devices 190 and 196 communicate with each other via the controller 24 to transfer measurement and control data between the storage systems 186 and 192.

It should be noted that the foregoing embodiments may be utilized in a variety of suitable systems. For example, in one embodiment, as shown in FIG. 7, a vehicle 210 in the form of an automobile (e.g., a car) having a battery module or system 212 for providing all or a portion of the motive power for the vehicle 210, and the battery system 212 may be controlled by and may include an embodiment of the controller described herein. In some embodiments, the vehicle 210 may be an electric vehicle (EV), a hybrid electric vehicle (HEV), a plug-in hybrid electric vehicle (PHEV), or any other type of vehicle using electric power for propulsion (collectively referred to as "electric vehicles"). Additionally, although illustrated as a car in FIG. 7, the type of the vehicle 210 may be implementation-specific, and, accordingly, may differ in other embodiments, all of which are intended to fall within the scope of the present disclosure. For example, the vehicle 210 may be a truck, bus, industrial vehicle, motorcycle, recreational vehicle, boat, or any other type of vehicle that may benefit from the use of electric power for all or a portion of its propulsion power.

Further, although the battery module 212 is illustrated in FIG. 1 as being positioned in the trunk or rear of the vehicle 210, according to other exemplary embodiments, the location of the battery module 212 may differ. For example, the position of the battery module 212 may be selected based on the available space within the vehicle 210, the desired weight balance of the vehicle 210, the location of other components used with the battery system (e.g., battery management systems, vents or cooling devices, etc.), and a variety of other implementation-specific considerations.

FIG. 8 illustrates a cutaway schematic view of the vehicle 210 provided in the form of an HEV according to a presently disclosed embodiment. In the illustrated embodiment, the battery module or system 212 is provided toward the rear of the vehicle 210 proximate a fuel tank 214. However, in other embodiments, the battery module 212 may be provided immediately adjacent the fuel tank 214 or may be provided in a separate compartment in the rear of the vehicle 210 (e.g., a trunk) or may be provided elsewhere in the vehicle 210. An internal combustion engine 216 is provided for times when the HEV utilizes gasoline power to propel the vehicle 210. An electric motor 218, a power split device 220, and a generator 222 are also provided as part of the vehicle drive system. Such an HEV may be powered or driven by just the battery system 212, by just the engine 216, or by both the battery system 212 and the engine 216. It should be noted that other types of vehicles and configurations for the vehicle electrical system may be used according to other embodiments, and that the schematic illustration of FIG. 8 should not be considered to limit the scope of the subject matter described in the present application. Indeed, according to various other embodiments, the size, shape, and location of the battery module or system 212, the type of vehicle 210, the type of vehicle technology (e.g., EV, HEV, PHEV, etc.), and the battery chemistry, among other features, may differ from those shown or described.

According to an embodiment, the battery module or system 212 is responsible for packaging or containing electrochemical cells or batteries, connecting the electrochemical cells to each other and/or to other components of the vehicle electrical system, and regulating the electrochemical cells and other features of the battery system 212. For example, the battery module or system 212 may include features that are responsible for monitoring and controlling the electrical performance of the system, managing the thermal behavior of the system, containment and/or routing of effluent (e.g., gases that may be vented from a battery cell), and other aspects of the battery module or system.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A control system for a vehicle, comprising:
a group of storage devices comprising:
a first storage device configured to store and release electrical energy;
a second storage device configured to store and release electrical energy;
an electromechanical system electrically coupled to the first storage device and the second storage device, wherein the electromechanical system is configured to:
generate an energy demand; and
utilize electrical energy received from the first storage device, the second storage device, or a combination thereof, to fulfill the energy demand; and
control logic communicatively coupled to the first storage device, the second storage device, and the electromechanical device, wherein the control logic is configured to achieve a predetermined objective by:
determining a first flow of electric charge between the first storage device and the second storage device and a second flow of electric charge between the group of storage devices and the electromechanical system, wherein the first and second flows achieve the predetermined objective while meeting the energy demand;
controlling: a first amount of electrical energy received from, released by, or a combination thereof, the first storage device based on the determined first and second flows of electric charge; and
controlling a second amount of electrical energy received from, released by, or a combination thereof, the second storage device based on the determined first and second flows of electric charge.

2. The control system of claim 1, wherein the predetermined objective comprises:
maximizing, minimizing, or maintaining within a predetermined window a parameter of the first storage device, the second storage device, or a combination thereof;
minimizing a monetary cost of operation of the system, or maximizing a fuel efficiency of the system.

3. The control system of claim 2, comprising a sensor system configured to measure the parameter, a second parameter of the surrounding environment, or a combination thereof, and to communicate measured data to the control logic.

4. The control system of claim 3, wherein the first parameter, the second parameter, or a combination thereof comprises an ambient temperature, a device temperature, a device lifetime, a state of charge, a state of health, a voltage, a capacity retention rate, a power density fade, or a combination thereof.

5. The control system of claim 1, wherein the electromechanical system comprises an electric vehicle or a hybrid-electric vehicle.

6. The control system of claim 1, wherein the first storage device, the second storage device, or a combination thereof comprises a charge storage device or an energy storage device.

7. The control system of claim 1, wherein the first storage device, the second storage device, or a combination thereof comprises a capacitor, a bank of capacitors, a lithium-based battery, a nickel-based battery, a lead-based battery, a bank of substantially similar batteries, a fuel cell, a capacitive electrode, a carbon electrode, a lead-carbon composite electrode, a lithium-carbon electrode, or an electrode comprising titanium.

8. The control system of claim 1, comprising a first switch coupled to the first storage device and a second switch coupled to the second storage device, and wherein the control logic is configured to control the first and second amounts of electrical energy by controlling the position of the first and second switches, respectively.

9. The control system of claim 1, wherein the group of storage devices is electrically coupled to the electromechanical system by power conversion circuitry, and wherein the control logic is configured to control the first and second amounts of electrical energy by controlling the power conversion circuitry.

10. A controller for a storage system configured to:
receive data corresponding to a parameter of a first storage device, a second storage device, or a combination thereof, wherein the parameter is related to a predetermined objective;
determine a first electric charge flow between the first storage device and the second storage device and a second electric charge flow between an electromechanical system and the combination of the first and second storage devices based on the parameter that achieves the predetermined objective while meeting an energy demand generated by the electromechanical system;
control a first amount of electrical energy received from, released by, or a combination thereof, the first storage device based on the determined first and second electric charge flows; and
control a second amount of electrical energy received from, released by, or a combination thereof, the second storage device based on the determined first and second electric charge flows.

11. The controller of claim 10, configured to:
receive one or more inputs corresponding to a driving pattern of a user, a driving history of a user, a user preference, an ambient temperature measurement, a humidity measurement, a vehicle destination, weather data, traffic data, fuel economy, monetary costs of operation, or a combination thereof; and determine the first electric charge flow, the second electric charge flow, or a combination thereof based at least on the one or more inputs.

12. The controller of claim 10, wherein the parameter comprises a device temperature, a device lifetime, a state of charge, a state of health, a voltage, a capacity retention rate, or a power density fade of the first storage device, the second storage device, or a combination thereof.

13. The controller of claim 10, wherein the predetermined objective comprises:
maximizing, minimizing, or maintaining within a predetermined window the parameter of the first storage device, the second storage device, or a combination thereof;
minimizing a monetary cost of operation of a system comprising the first storage device, the second storage device, and the electromechanical system; or
maximizing a fuel efficiency of the system.

14. The controller of claim 10, wherein controlling the first amount of electrical energy comprises controlling a state of a first switch coupled to the first storage device and controlling the second amount of electrical energy comprises controlling a position of a second state coupled to the second storage device.

15. A control system for an electromechanical system of a vehicle, comprising:
a first storage system comprising:
a first storage device configured to store and release electrical energy;
a first switch electrically coupled to the first storage device; and
a first communication device configured to control a state of the first switch;
a second storage system comprising:
a second storage device configured to store and release electrical energy;
a second switch electrically coupled to the second storage device; and
a second communication device configured to control a state of the second switch;
a load configured to utilize electrical energy received from the first storage system, the second storage system, or a combination thereof; and
a controller communicatively coupled to the first communication device, the second communication device, and the load, wherein the controller is configured to achieve a predetermined objective by:
determining a first electric charge flow between the first storage system and the second storage system and a second electric charge flow between the load and a combination of the first storage system and the second storage system that achieves the predetermined objective while meeting an energy demand generated by the load;
sending a first control signal to the first communication device to control the state of the first switch based on the determined first and second electric charge flows; and
sending a second control signal to the second communication device to control the state of the second switch based on the determined first and second electric charge flows.

16. The system of claim 15, wherein the load comprises an electromechanical system comprising an electric vehicle or a hybrid-electric vehicle.

17. The control system of claim 15, wherein the predetermined objective comprises:
maximizing, minimizing, or maintaining with a predetermined window a parameter of the first storage system, the second storage system, or a combination thereof;
maximizing a lifespan of the first storage system, the second storage system, or a combination thereof;
minimizing a monetary cost of operation of the system, or maximizing a fuel efficiency of the system.

18. The control system of claim 17, comprising a sensor system configured to measure the first operating parameter, the second operating parameter, the third operating parameter, a fourth operating parameter of the surrounding environment, or a combination thereof, and to communicate measured data to the control logic.

19. A method for a control system, comprising:
receiving a predetermined objective;
receiving a parameter of a first storage device, a second storage device, or a combination thereof, wherein the parameter is related to the predetermined objective;
determining a first electric charge flow between the first storage device and the second storage device and a second electric charge flow between an electromechanical system and the combination of the first and second storage devices that achieves the predetermined objective based on the parameter while meeting an energy demand;
controlling a first amount of electrical energy received from and released by the first storage device based on the determined first and second electric charge flows; and
controlling a second amount of electrical energy received from and released by the second storage device based on the determined first and second electric charge flows.

20. The method of claim 19, wherein the predetermined objective comprises maximizing the parameter of the first storage device, the second storage device, or a combination thereof; minimizing the parameter of the first storage device, the second storage device, or a combination thereof; restricting the parameter of the first storage device, the second storage device, or a combination thereof within a parameter window; minimizing a monetary cost of operation of a system comprising the first storage device, the second storage device, and the electromechanical system; or maximizing a fuel efficiency of the system.

21. The method of claim 19, wherein the parameter comprises a device temperature, a device lifetime, a state of charge, a state of health, a voltage, a capacity retention rate, or a power density fade.

* * * * *